(12) United States Patent
Sherr et al.

(10) Patent No.: US 10,099,135 B2
(45) Date of Patent: Oct. 16, 2018

(54) RELATIVE INVERSE KINEMATICS GRAPHICAL USER INTERFACE TOOL

(71) Applicant: ELECTRONIC ARTS INC., Redwood City, CA (US)

(72) Inventors: Simon Sherr, Casselberry, FL (US); Dominique Parker, Redwood City, CA (US); John Cheu, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 15/435,253

(22) Filed: Feb. 16, 2017

(65) Prior Publication Data

US 2018/0229122 A1 Aug. 16, 2018

(51) Int. Cl.
| | |
|---|---|
| *G06F 17/00* | (2006.01) |
| *A63F 13/537* | (2014.01) |
| *G06F 3/0484* | (2013.01) |
| *G06T 13/80* | (2011.01) |
| *G06T 11/20* | (2006.01) |
| *A63F 13/57* | (2014.01) |

(52) U.S. Cl.
CPC ............ *A63F 13/537* (2014.09); *A63F 13/57* (2014.09); *G06F 3/04842* (2013.01); *G06T 11/203* (2013.01); *G06T 13/80* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 8,154,552 | B2* | 4/2012 | Girard | G06T 13/40 |
| | | | | 345/473 |
| 8,237,719 | B1* | 8/2012 | Trezevant | G06T 13/00 |
| | | | | 345/473 |
| 9,342,913 | B2* | 5/2016 | Wong | G06T 13/20 |

OTHER PUBLICATIONS

Karen Moltenbrey, Contact Sport, Computer Geographies World, vol. 34 Issue 1, Jan.-Feb. 2011, 12 Pages http://www.cgw.com/Publications/CGW/2011/Volume-34-Issue-1-Jan-Feb-2011-/Contact-Sport.aspx.

Simon Sherr, EA Diaries: How we built MMA, How EA Tiburon modernised the fighting genre with ANT and Autodesk technology, Dec. 3, 2010, 2 pages. http://www.develop-online.net/interview/ea-diaries-how-we-built-mma/0116926.

(Continued)

*Primary Examiner* — Ronald Laneau
(74) *Attorney, Agent, or Firm* — Lowenstein Sandler LLP

(57) ABSTRACT

A method of relative inverse kinematics graphical user interface may include providing, a first view of a graphical user interface (GUI) to be displayed, wherein the first view is associated with relative inverse kinematics (RIK) of a game character of a video game and receiving a selection of a first GUI element comprised by the first view of the GUI, the selection indicating that a RIK target is to be added to an animation associated with the game character of the video game. The method may further include, in response to the receiving the selection, providing a second view of the GUI to be displayed, wherein the second view comprises an inverse kinematic (IK) joint option, a relative actor option, and a relative joint option, the options associated with the animation, receiving selections corresponding to the options, and configuring the animation according to the selections corresponding to the options.

20 Claims, 9 Drawing Sheets

(56) References Cited

OTHER PUBLICATIONS

Lee Dowsett and Geoff Harrower, "Animation workflows for submission, fighter personality and locomotion features", Mar. 3, 2015, 48 pages http://twvideo01.ubm-us.net/o1/vault/gdc2015/presentations/dowsett_lee_UFC.pdf.

* cited by examiner

RELATIVE INVERSE KINEMATICS GRAPHICAL USER INTERFACE TOOL

TECHNICAL FIELD

The present disclosure is generally related to a relative inverse kinematics (RIK) graphical user interface (GUI) tool, and is more specifically related to proving a RIK development environment via a GUI.

BACKGROUND

One problem involving interactions between two characters in a video game is that the characters are frequently authored such that the characters are relatively the same size. When characters are then scaled (e.g. taller, shorter, thinner, thicker, etc.) according to in-game options, the characters' pose may be different than originally authored. If the two players have different scales than those originally authored, their poses may not line up and an animation involving the scaled characters may no longer look as intended. For example, if, in a boxing video game, one player is scaled to be one foot taller than originally authored, his punches may not land on the intended body part of his opponent since the punching animation was authored for a much shorter character.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
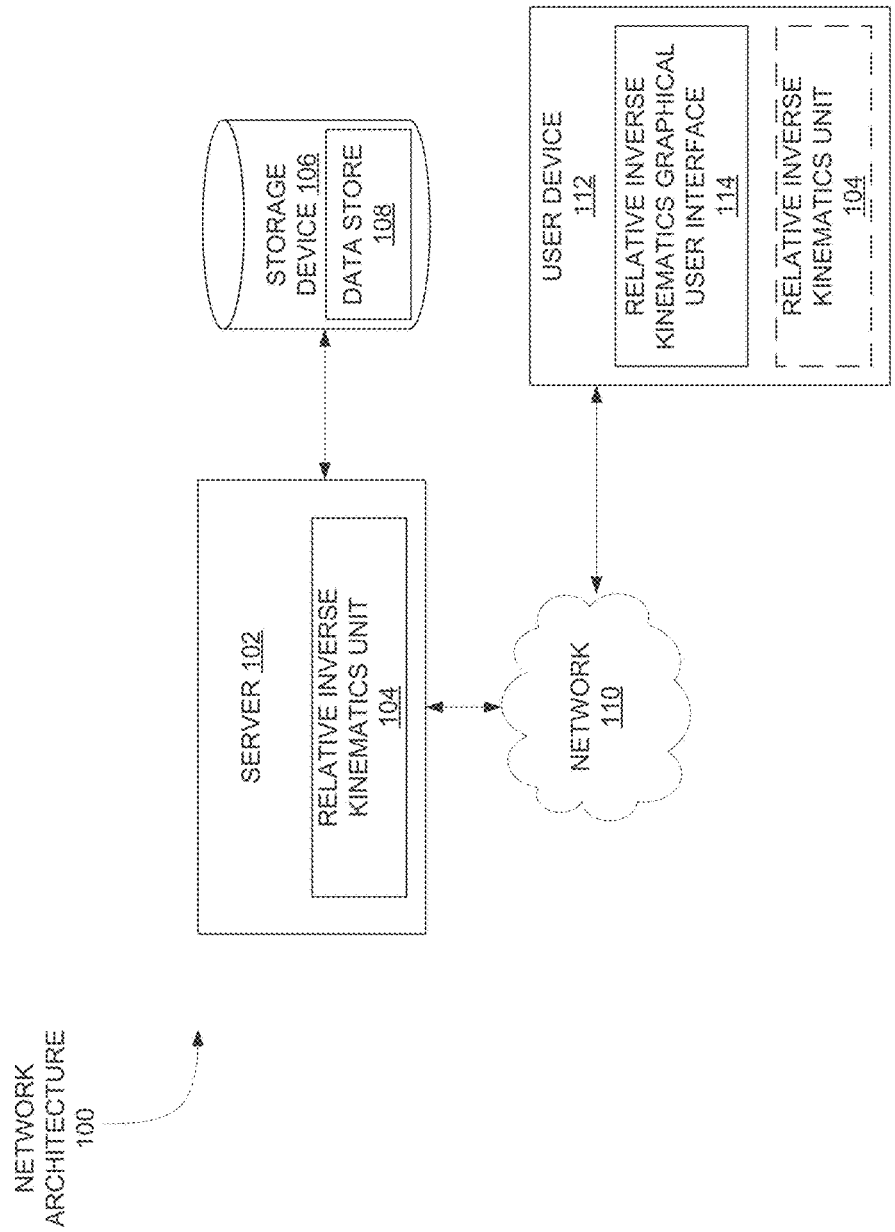
FIG. 1 is a block diagram illustrating an exemplary network architecture in which embodiments of the present disclosure may be implemented.

Described herein are methods and systems for RIK development. Such methods and systems may allow developers to easily author scalable video game interaction animations between game characters.

One way in which interaction scenarios involving scaled characters may be performed is by removing all scaling during gameplay. This has the unfortunate disadvantage of producing unrealistic character renderings (e.g., a 6'4" character may look to be the same height as a 5'4" character).

Another way in which the interaction may be created is by reducing the scalability of players. In this option, a video game player may have the option to select a height in the range of 5'10" to 6'2" for his or her character. This option merely hides the fact that interaction animations are inaccurate and unnecessarily limits the scalability of game characters.

Alternatively, interaction scale tags may be used. Interaction scale tags adjust effectors based on a player's scale. For instance, in a handshake, both players may be tagged with an interaction scale tag affecting the hand. Taller players may adjust the target to reach downwards (e.g., align to a non-scaled target). Shorter players may adjust the target to reach upwards (e.g., align to a non-scaled target). Using interaction scale tags may work when operating on joints that can use IK to move towards each other (e.g., a hand and a hand). For players needing to align a taller player's hand to a shorter player's chest, however, it doesn't make sense to lift the shorter player's chest, and so a gap may remain.

Embodiments of the present disclosure address the above problems by allowing developers to easily author character interactions and animations for RIK. It should be noted that although the term game "character" is used for convenience, RIK applies to all other embodiments of objects included in video games (e.g., players, animals, monsters, aliens, inanimate objects, etc.), Furthermore, RIK applies to video games, computer games, and games developed for television and all other platforms. Embodiments described herein describe operations that include providing an easy to user graphical user interface for RIK development. This system gives content creators complete control to author RIK interactions that are easily scalable and continue to look natural.

The present disclosure addresses traditional deficiencies using relative inverse kinematics (RIK). RIK uses inverse kinematics to position effectors (e.g., an animated body party of a game character) relative to another actor's joints. Inverse kinematics may refer to the use of kinematics equations to determine the joint parameters of a game character that provide a desired position of an effector (e.g. a body part of a game character). The movement of a kinematic chain of an animated game character may be modeled by the kinematics equations of the chain. These equations define the configuration of the chain in terms of its joint parameters. Forward kinematics uses the joint parameters to compute the configuration of the chain, and inverse kinematics reverses this calculation to determine the joint parameters that achieves a desired configuration.

Using RIK, players can be posed such that an animation of a scaled game character is visually pleasing by removing the interpenetration (e.g., one player's hand improperly penetrating another player's chest) and gaps (e.g., one player's hand improperly missing contact with another player's chest).

RIK is a system for preserving spatial relationships between two parts (e.g., two body parts) as they were authored in animation. At runtime, spatial relationships may be violated when animations are played back on characters that are scaled or positioned differently than they were in the authoring environment. RIK uses one or many IK (Inverse Kinematics) solvers to manipulate the pose of the affected characters so that the relationships can be satisfied, despite the scaled characters. RIK records the offset of one body part relative to another as authored in every frame of animation and uses one or many IK solvers to restore that offset at runtime.

It is worth noting that a spatial relationship between two constituent parts of an animation exists when the relative positioning of those two parts is important. In one embodiment, the parts can belong to different animated characters, as is the case when one character's fist connects with another's head during a strike animation. In another embodiment, the two parts can also belong to the same animated character, such as when a character places a hand on his hip.

In one embodiment, a spatial relationship does not imply that there is contact between the two parts; it may only be implied that their position relative to one another is meaningful. For example, when a character raises his hand to shield his eyes from a bright light source, the hand does not need to make contact with any other body part, but it is important that the hand is in front of the eyes.

In various embodiments, spatial relationships can be dynamic and of arbitrary duration. Spatial relationships may be momentary, as is the case with the strike animation mentioned above—the spatial relationship gains in significance as the striking fist closes gets closer to the opponents head, culminates at the moment of impact, then dissipates as the hand separates from the head. Relationships may also be of any duration, such as when a character twiddles his thumbs—it can last for any length of time, and the thumbs are in constant motion with respect to each other.

FIG. 1 is a block diagram illustrating an exemplary network architecture in which embodiments of the present disclosure may be implemented. The network architecture 100 may include one or more servers 102 communicating with one or more storage devices 120 and one or more user devices 112 over one or more networks 110, according to one embodiment. Network 110 can be a local area network (LAN), a wireless network, a telephone network, a mobile communications network, a wide area network (WAN), such as the Internet, or similar communication system.

Server 102 may include a network-accessible server-based functionality, various data stores, and/or other data processing equipment. The server 102 may be implemented by a single machine or a cluster of machines. Server 102 may include, for example, computer system 900 of FIG. 9. In one embodiment, server 102 includes relative inverse kinematics module 104. Relative inverse kinematics module 104 may perform relative inverse kinematics operations on data provided by storage device 120 and/or user devices 112. It should be noted that relative inverse kinematics unit may be included in user device 112, in addition to or instead of being included on server 102.

Server 102 may be one server or it may represent multiple servers. In one embodiment, when a first user device connects to server 102 and a second user device connects to server 102, server 102 may be the same server that handles both devices' connections. In another embodiment, when a first user device connects to server 102 and a second user device connects to server 102, server 102 may represent different servers, so that each device connects to a different server.

In one embodiment, storage device 120 includes data store 122, which may include data provided by server 102 and/or user devices 112. In another embodiment, data provided by server 102 and/or user devices 112 are stored elsewhere, outside of data store 122 or storage device 120.

In one embodiment, server 102 may include relative inverse kinematics module 104 and storage device 120. In another embodiment, storage device 120 may be external to server 102 and may be connected to server 102 over a network or other connection. In other embodiments, server 102 may include different and/or additional components which are not shown here so as not to obscure the present disclosure. Storage device 120 may include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

In one embodiment, user devices 112 may be any computing device (e.g., personal computer, server, mobile device, tablet, game system, etc.). User device may include, for example, computer system 900 of FIG. 9. User devices 130 may include a gaming system used to play games that include RIK authored interaction animations. Multiple user devices 112 may be connected via network 110.

Figure 2:
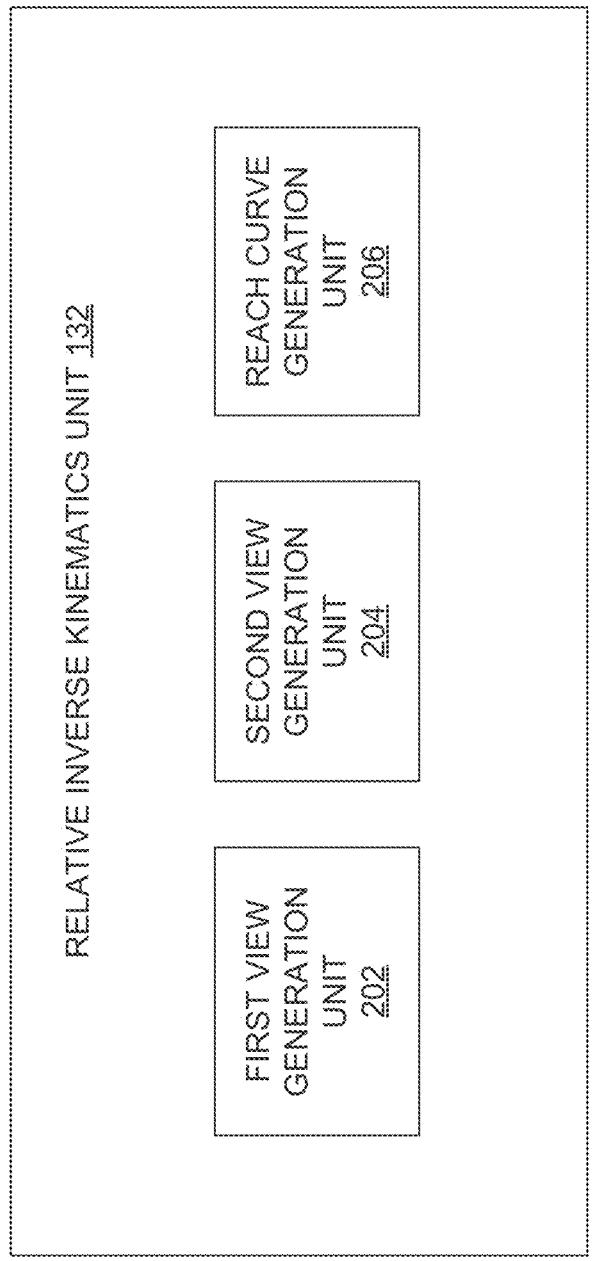
FIG. 2 is a block diagram illustrating a relative inverse kinematics unit, according to an implementation.

FIG. 2 is a block diagram illustrating a multi-character interacting scenario unit 104, according to an implementation. In one embodiment, relative inverse kinematics module 104 is included in server 102 of FIG. 1. Multi-character interaction scenario unit may include a first view generation unit 202, second view generation unit 204, and reach curve generation unit 206. This arrangement of units may be a logical separation, and in other embodiments, these units or other components can be combined together or separated in further components, according to a particular embodiment.

Figure 4:
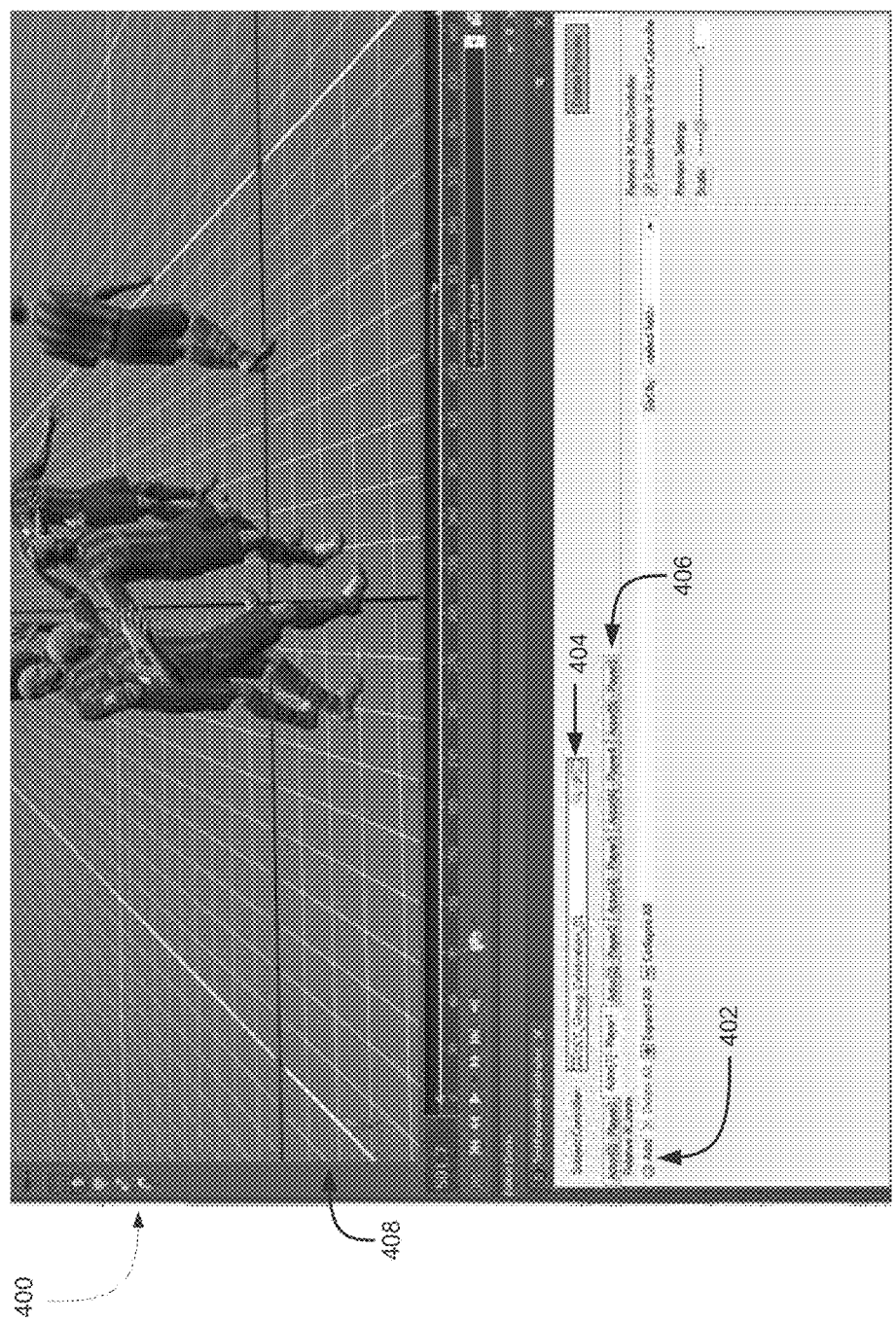
FIG. 4 is a block diagram illustrating a first view of a relative inverse kinematics graphical user interface, according to an implementation.

First view generation unit 202 may be responsible for generating and providing the first view of the RIK GUI (e.g., first view 400 of FIG. 4). The first view of the RIK GUI may be a tab, page, or other GUI view. In one embodiment, the first view the RIK GUI includes various selectable GUI elements that provide RIK authoring operations to developers. The first view may be associated with a particular game animation, character, and/or RIK interaction between multiple characters. In one embodiment, the first view of the RIK includes a selectable GUI element, that when selected, allows for the providing of a second view of the RIK GUI.

In one embodiment, the second view of the RIK GUI (e.g., second view 500 of FIG. 5) is generated and provided by the second view generation unit 204. Like the first view of the RIK GUI, the second view of the RIK GUI a tab, page, or other GUI view. In one embodiment, the second view the RIK GUI includes various selectable GUI elements that provide RIK authoring operations to developers. The second view may be associated with a particular game animation, character, and/or RIK interaction between multiple characters. In one embodiment, the second view of the RIK includes one or more selectable GUI elements, that when selected, allow for the authoring of an RIK interaction. The first and second views of the RIK GUI, as well as their included GUI elements, will be described in detail with respect to the remaining figures.

In one embodiment, the second view of a RIK GUI may provide various GUI elements related to reach curves associated with RIK interactions. In one embodiment, reach curve generation unit 204 provides developers access to operations related to a reach curves of a RIK interaction authoring and performs reach curve calculations. In one embodiment, a reach curve may define how quickly a RIK interaction animation transforms to adjust to a scaled game character. RIK reach curves will be described in detail with respect to FIGS. 5-8.

Figure 3:
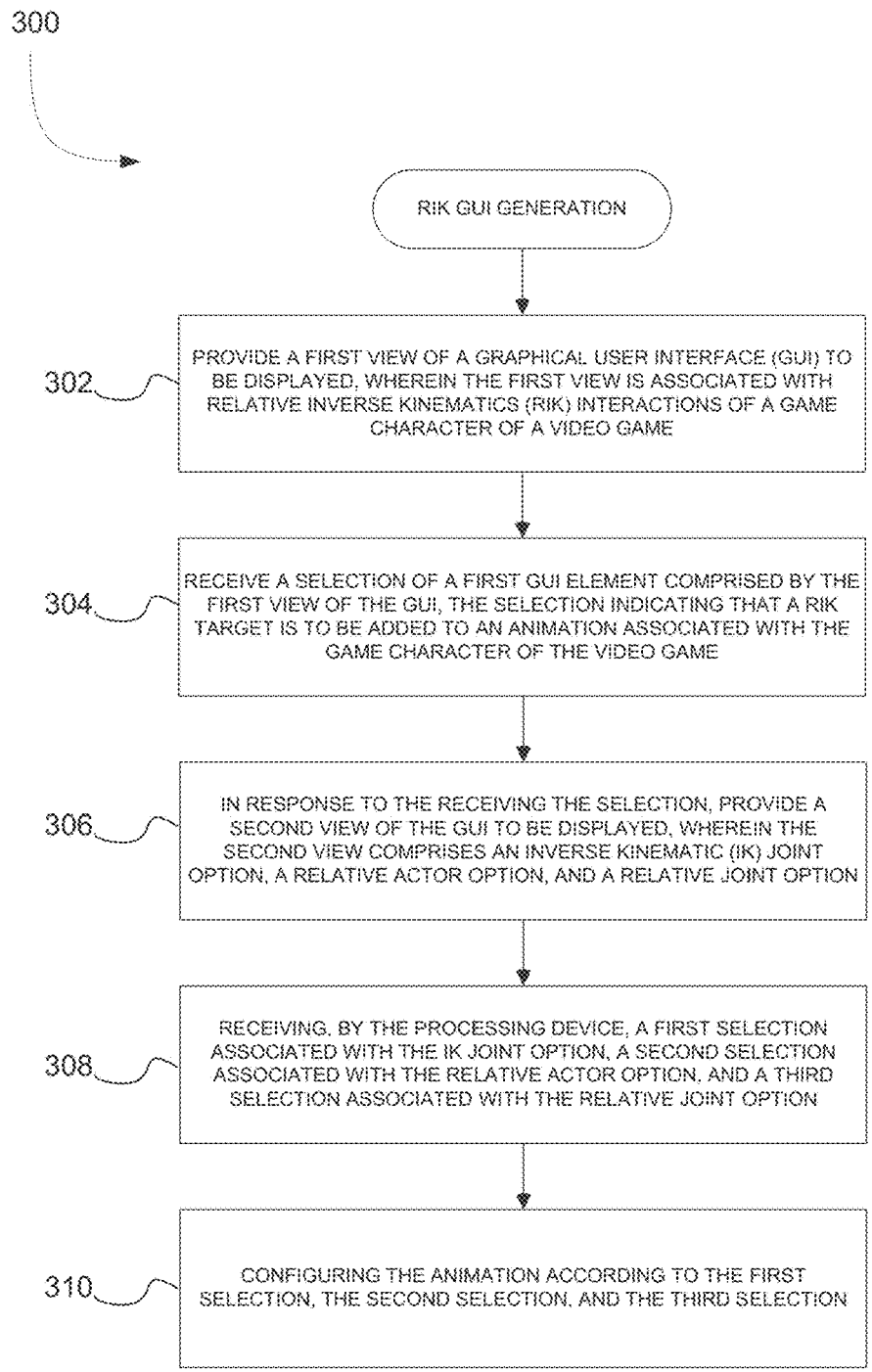
FIG. 3 is a flow diagram illustrating a relative inverse kinematics processing flow, according to an implementation.

FIG. 3 is a flow diagram illustrating a multi-character interaction scenario processing flow, according to an implementation. The processing flow method 300 may be performed by processing logic that comprises hardware (e.g., circuitry, dedicated logic, programmable logic, microcode, etc.), software (e.g., instructions run on a processing device to perform hardware simulation), or a combination thereof. Method 300 can provide operations for a RIK GUI tool. In one embodiment, relative inverse kinematics module 104 may perform method 300. Method 300 may be performed in any order so as to fit the needs of the functionality to be provided.

Referring to FIG. 3, at block 302, processing logic provides, by a processing device, a first view of a GUI to be displayed on a client device. In one embodiment, the first view is associated with relative inverse kinematics (RIK) interactions of a game character of a video game. The first view may further be associated with RIK interactions of a game character corresponding to a specific animation, in which the game character is included (e.g., see first view 400 of FIG. 4 and corresponding description).

In one embodiment, processing logic provides, in the first view, a GUI element that allows a developer to indicate his request to author a new RIK interaction. The GUI element may take the form of a button, as shown in FIG. 4, a dropdown menu, a radial checkbox, or any other form of selectable GUI element.

At block 304, processing logic may receive, by the processing device, a selection of a first GUI element (e.g., the new RIK interaction GUI element) comprised by the first view of the GUI, the selection indicating that a RIK target (RIK interaction) is to be added to an animation associated with the game character of the video game. In one embodiment, there is no limit to the number of RIK targets that may be added to an animation. In another embodiment, the number of RIK targets that may be added to an animation are only limited by the number of eligible joints (e.g., joints to which RIK interactions may be attached) associated with game characters in the animation.

At block 306, in response to the receiving the selection of the GUI element indicating that a new RIK target should be added to an animation, processing logic may provide a second view of the GUI to be displayed on the client device. In one embodiment, the second view may include options specific to the authoring of a new RIK target. For example, the second view may include an inverse kinematic (IK) joint option, a relative actor option, and a relative joint option, the options associated with the animation. It should be noted that the operations provided by the second view of the RIK GUI may be provided by the first page of the RIK GUI in an alternative embodiment.

In one embodiment, an IK joint option may allow a user to select from various eligible joints associated with the game character for which the current RIK target is being authored. IK joints may be located in game characters' physical joints, head, chest, or anywhere else on or in a game characters' body. In one embodiment, the relative actor option may allow a user to select from various eligible game characters, with whom the current RIK target is to be authored. For example, if an RIK target is being authored for a ball-carrier in a video game, the relative actor option may allow a developer to select from other available game characters (e.g., potential tacklers) in the animation, with whom the ball-carrier may interact. The relative joint option may include eligible joints of the selected relative character, for which a RIK spatial relationship may be established. For example, a RIK spatial relationship may be established between the hand of the ball-carrier (the IK joint), and the chest (the relative joint) of a potential tackler (the relative actor) in a stiff-arm animation.

At block 308, processing logic may receive selections corresponding to the options described above. In one embodiment, the selections are determined by a developer selecting from available options in drop down menus. In another embodiment, developers may manually input their selections. At block 310, processing logic configures the animation according to the selections corresponding to the options. In one embodiment, the animation may be configured to include the newly authored RIK target, created by mapping the source effector (the IK joint) to a target effector (the relative joint associated with the relative actor) according to the selected options. In one embodiment, the new RIK target records the offset of the IK joint relative to the relative joint of the relative actor, as authored in every frame of animation and uses one or many IK solvers to restore that offset at runtime. In is worth mentioning that templates may be used to create RIK targets. Templates may allow for the copying of predefined constraints from one RIK target to another.

FIG. 4 is a block diagram illustrating a first view 400 of a relative inverse kinematics graphical user interface, according to an implementation. In one embodiment, first view 400 includes a selectable GUI element 402 that allows a developer to add a RIK target to the current animation (displayed at 404). Selecting element 402 may cause a second view of the RIK GUI tool to be displayed, where the second view provides additional tools that allow for RIK target authoring. In one embodiment, element 404 is a button that displays graphics to indicate its function. In another embodiment, the button may include text. Hovering over the button may provide the user with additional information describing the function of the button.

In one embodiment, the first view 400 is unique with respect to each game character in the current animation. For example, first view 400 may include tabs 406 for each game character in the animation, allowing the user to easily go between views in the RIK GUI tool. Once RIK targets have been added to respective characters, each authored RIK target may be displayed on each of the characters' respective view. First view 400 may include functionality that allows users to delete, modify, sort, and/or preview authored RIK targets. For example, first view 400 may include previewer 408, which allows a user to view the animation, with authored RIK targets, in real time, slowed down, or frame by frame. Advantageously, this allows a developer to ensure that authored RIK targets look as intended in the animation, and modify them if they don't.

Figure 5:
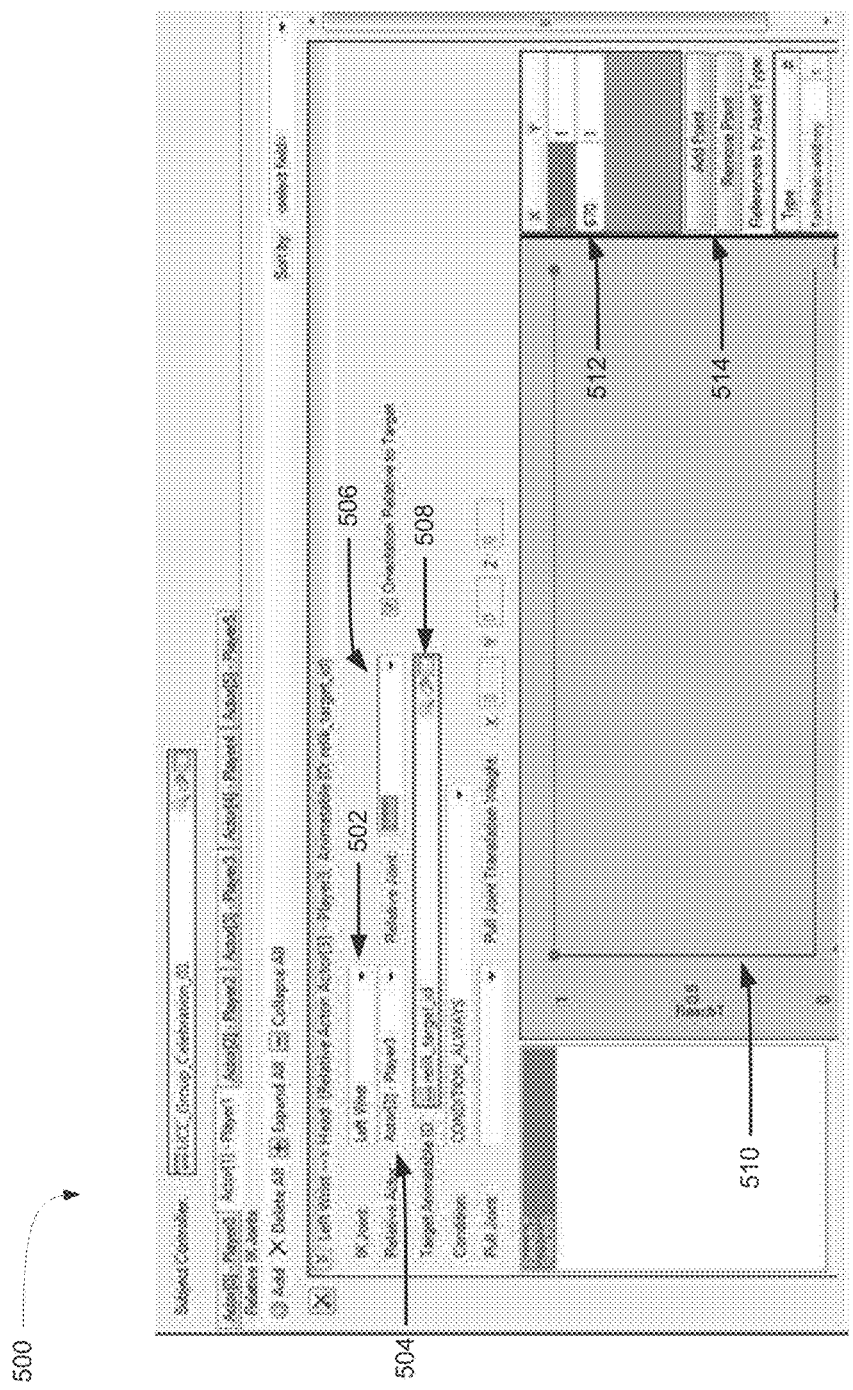
FIG. 5 is a block diagram illustrating a second view of a relative inverse kinematics graphical user interface, according to an implementation.
Figure 6:
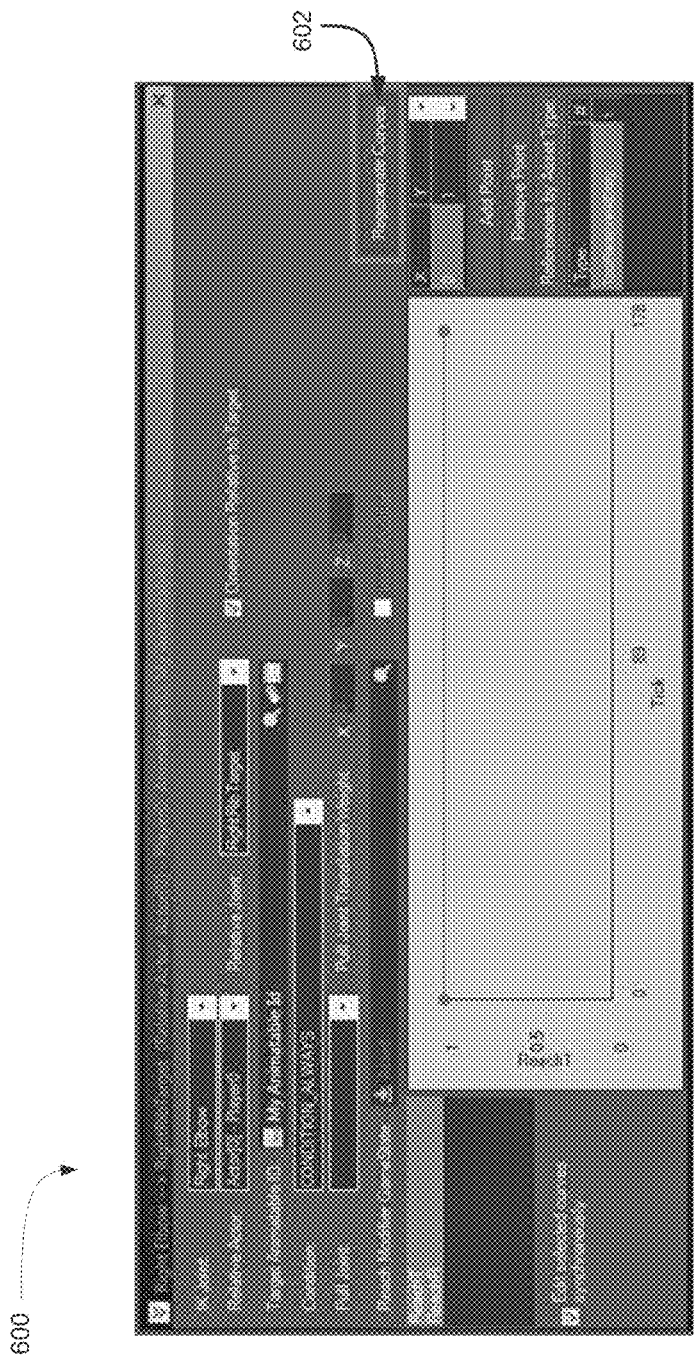
FIG. 6 is a block diagram further illustrating a second view of a relative inverse kinematics graphical user interface, according to an implementation.

FIG. 5 is a block diagram illustrating a second view of a relative inverse kinematics graphical user interface, according to an implementation. In one embodiment, when a user selects the "add" element of the first view 400, he or she is brought to the second view 500. Second view 500 may include an IK joint option 502, relative actor option 504, and relative joint option 506, as described above with respect to FIG. 3. In another embodiment, second view 500 may include a target animatable identification (ID) option 508. The target animateable ID may be the GameState that contains the animatable ID of the actor to which the effector is to be relatively positioned.

In one embodiment, each actor in a scene may be assigned a unique number called the animatable ID. Using an animatable ID, the scene may be queried to obtain a reference to the actor having that ID. An animatable ID GameState may be a variable whose value is an animatable ID. Each animatable may have its own copy of the GameState variable, allowing them to each potentially store a different value (e.g., a member variable of a class instance). A game may use any number of animatable ID GameStates to track any number of metric. For example, in a fighting game, each fighter may store the other fighter's (his or her opponent's) animatable ID. In another example, actors in a scene of a basketball game may point to the one actor that is in possession of the ball, and a new value may be assigned each time the ball changes possession In one embodiment, an RIK constraint (a position of one object relative to another) is assigned an animatable ID GameState so that the RIK system can identify at runtime which actor the constraint is relative to. The target animatable ID GameState is specified on each constraint, since there can be multiple constraints relative to different actors active at once. For example, in a fighting game when the match result is announced, the referee may hold the wrist of a different fighter with each of his hands, and then raise the hand of the victor. In that case, the referee will have a losing fighter animatable ID GameState assigned to one constraint and a winning fighter animatable ID GameState assigned to the other constraint, which are both populated by the game's scoring system when the match outcome is determined.

In one embodiment, an RIK editor manages the scene. The RIK editor may instantiate one actor for each track in the sequence selected in second view 500 and the scene may contain the actors that play a role in that sequence. The editor may write the animatable ID of the actor selected in 504 to the GameState variable selected in 508. The runtime portion of RIK may read the target animatable ID 508 and rely on it to resolve the actors. In one embodiment, during gameplay, RIK does not play a role in scene management, and expects game logic to independently populate the animatable IDs.

In one embodiment, second view 500 may also include a condition field. The condition field may allow a user to enable targets specifically based on whether the actor is taller or shorter. Advantageously, setting the condition may be useful for situations where a taller or equal height player might reach over the shoulder of another character, but a shorter player would not be able to. In such a case the condition field may be set for a taller or equal-height character for a RIK target that allows for the reach. A separate RIK target with the condition set to a different RIK target for a shorter player may be authored for the same animation.

In one embodiment, second view 500 includes a reach curve graph 510, reach curve table 512, and additional reach curve GUI elements 514. The reach curve graph may represent a function of effector reach over time. In one embodiment, points can be added to the graph to manipulate the reach curve over time by adding points using the table 512 and elements 514 to the right of the graph 510. In another embodiment, reach curve points may be added directly to the graph by interacting directly with the graph itself. The second view may also include a GUI element that allows for the automatic generation of reach curves. Second view 600 of FIG. 6 displays such a GUI element 602. Reach curves will be described in detail in the following FIGS. 7-8.

Figure 7:
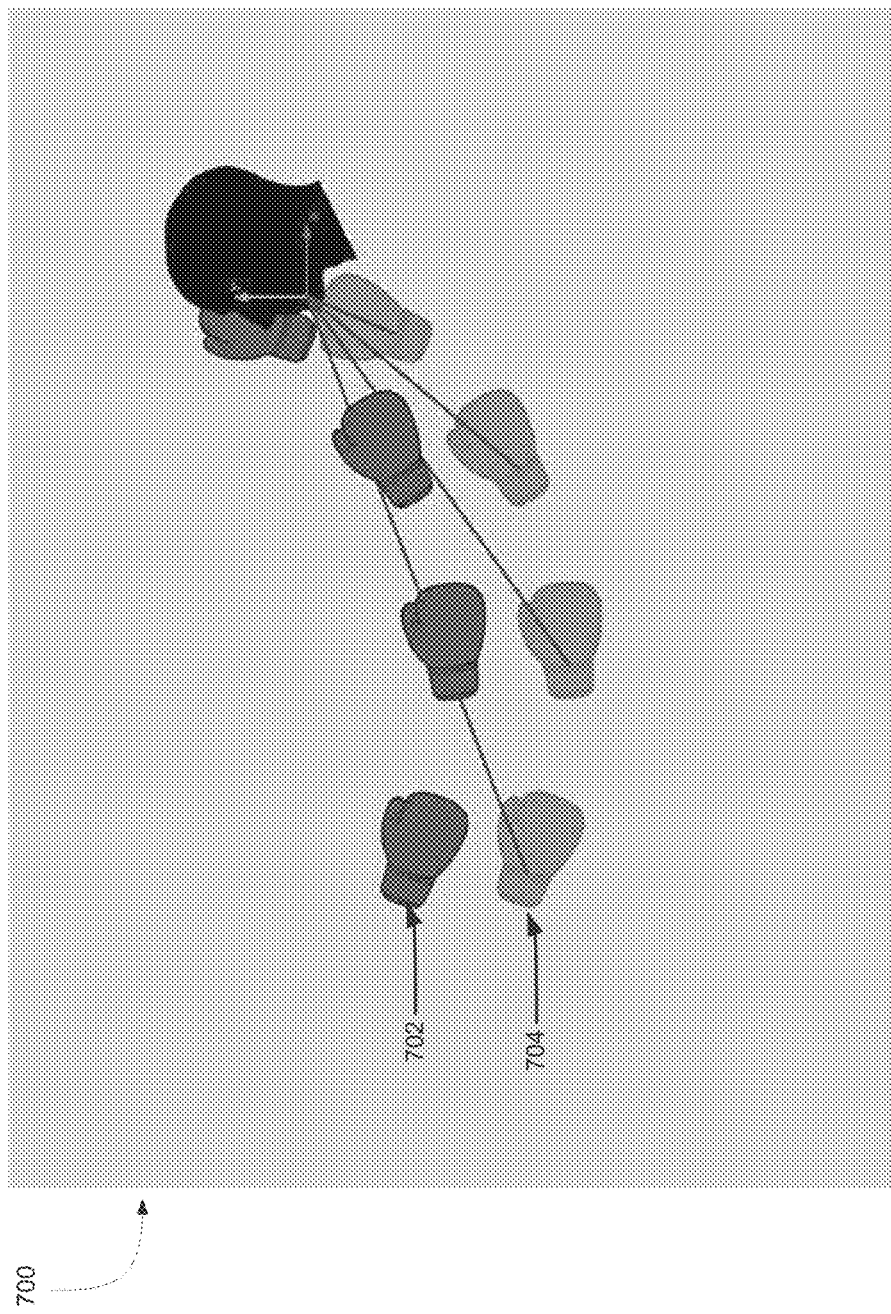
FIG. 7 is a block diagram illustrating a strike animation for characters with different heights, according to an implementation.

FIG. 7 is a block diagram illustrating a strike animation 700 for characters with different heights, according to an implementation. Reach curves may be adjusted to provide a more life-like animation by manipulating RIK animations. Consider the following example, for which a developer would like to preserve the spatial relationship between a game character's fist swinging to connect with an opponent's chin. Given that one would expect the striker to aim his fist at his target's head, and not vice versa, an RIK constraint may be established for the fist (IK joint) relative to the head (relative joint of the relative actor). RIK records the offset of the hand for every frame of animation relative to the head, in the head's local coordinate space (704) to define the constraint.

When the strike animation is played back on a character that is much taller than the sample character that was used to author the animation, the arc of the fist may be much higher than it was in the authoring environment 702. The animated arc of the fist, shown by glove 702, may ultimately miss its original target (the chin of the opponent) and embeds itself elsewhere in the head. A similar phenomenon may also be observed if the character being punched was shorter. Having a record of the offsets that the hand is expected to have relative to the head, RIK can calculate where the hand is expected to be.

In one embodiment, since the importance of the appearance of the special relationship may increase as the fist approaches the head, a developer may influence the effect of RIK by tuning a reach curve (e.g. reach curve 510 of FIG. 5). In one embodiment, a reach curve specifies how much RIK should manipulate a character's pose from where it was animated to where it is expected to be.

Figure 8:
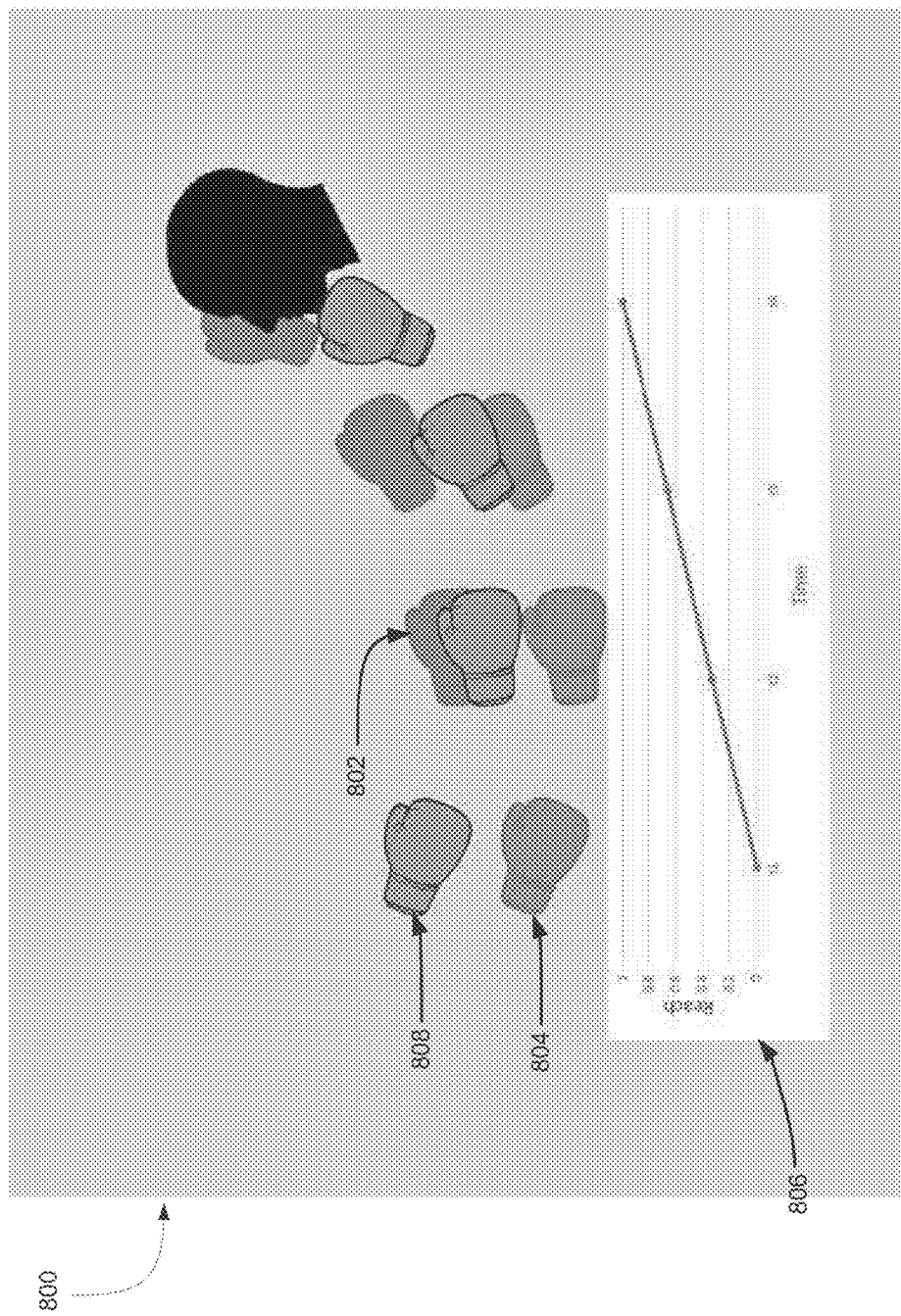
FIG. 8 is a block diagram illustrating a reach curve adjustment animation, according to an implementation.

FIG. 8 is a block diagram illustrating a reach curve adjustment animation 800, according to an implementation. In animation 800, RIK interpolates between the animated pose 802 and the expected pose 804 using the value of the reach curve 806 to calculate a target pose 808. RIK may then delegate the task of manipulating the character's pose to achieve the target pose to an IK solver. As demonstrated in reach curve 806, points added to reach curves for reach over time affect the target pose by applying a weight over time to the animated pose. For example, in reach curve 806, a time t1 a weight of 0 is applied to the animated pose, the expected pose 808 is shown in the same position as the animated pose 802 during that time. At time t2, a weight of about 0.38 is applied to the animated pose 802, so expected pose 808 is shown partially between animated pose 802 and expected pose 804. At time t3, the animated pose is further weighted by a value of about 0.65 and, as expected, the target pose is shown between the animated pose 802 and expected pose 804, but this time a little closer to expected pose 804. By time t4, the animated pose is weighted by a value of 1, so the target pose is shown fully in the position of the expected pose 804.

Figure 9:
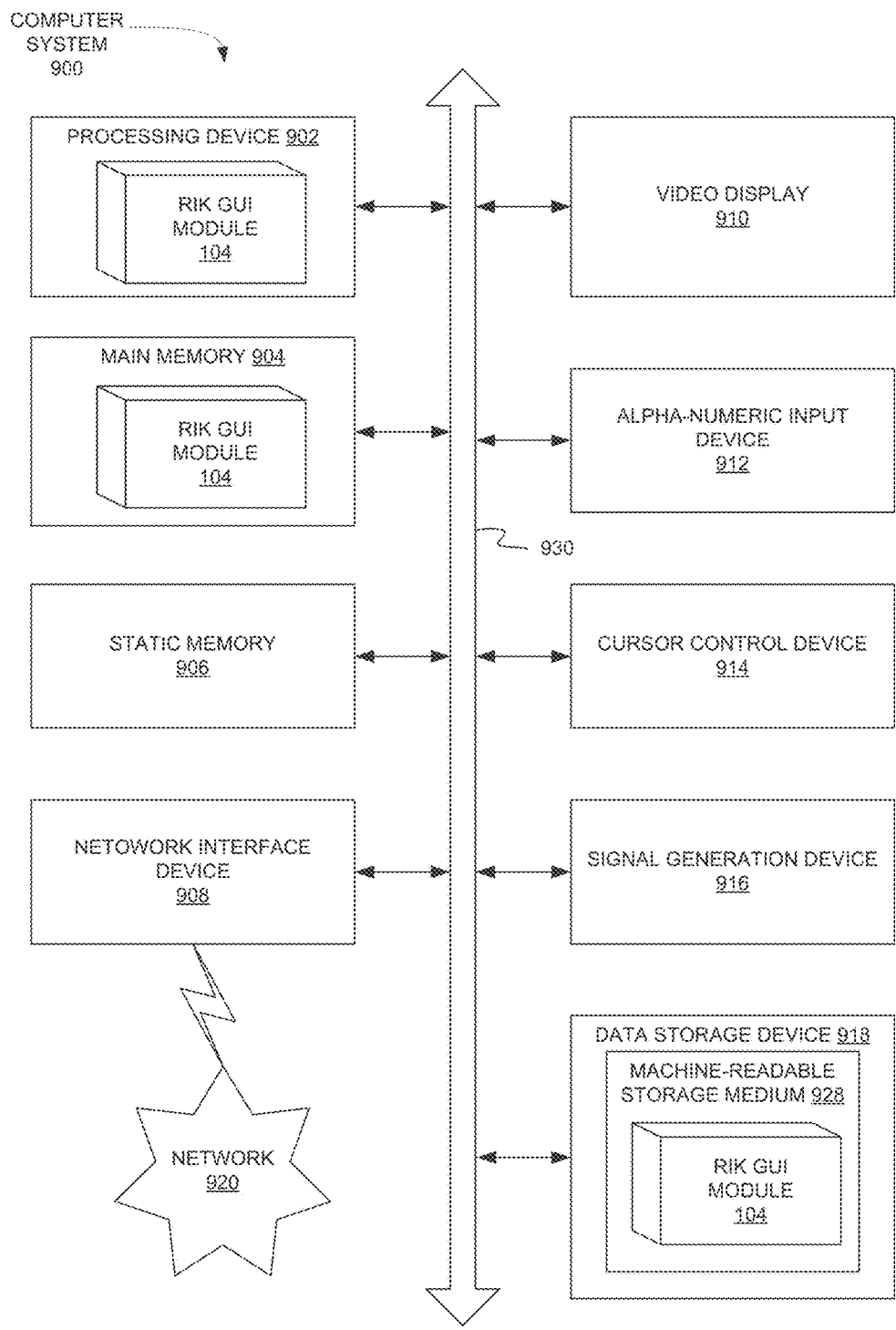
FIG. 9 is a block diagram of an example computer system that may perform one or more of the operations described herein.

FIG. 9 illustrates a diagrammatic representation of a computing device 900 which may implement the systems and methods described herein. Computing device 900 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 900 may include a processing device (e.g., a general purpose processor) 902, a main memory 904 (e.g., synchronous dynamic random access memory (DRAM), read-only memory (ROM)), a static memory 906 (e.g., flash memory and a data storage device 918), which may communicate with each other via a bus 930.

Processing device 902 may be provided by one or more general-purpose processing devices such as a microprocessor, central processing unit, or the like. In an illustrative example, processing device 902 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 902 may also comprise one or more special-purpose processing devices such as an application specific integrated circuit (ASIC), a field programmable gate array (FPGA), a digital signal processor (DSP), network processor, or the like. The processing device 902 may be configured to execute relative inverse kinematics module 104 implementing methods 300, 400, and 500 for carrying out multi-character interaction scenario operations, in accordance with one or more aspects of the present disclosure, for performing the operations and steps discussed herein.

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912, and cursor control device 914 may be combined into a single component or device (e.g., an LCD touch screen).

Data storage device 918 may include a computer-readable storage medium 928 on which may be stored one or more sets of instructions, e.g., instructions of relative inverse kinematics module 104 implementing methods 300, 400, and 500 for carrying out multi-character interaction scenario operations, in accordance with one or more aspects of the present disclosure. Instructions implementing module 926 may also reside, completely or at least partially, within main memory 904 and/or within processing device 902 during execution thereof by computing device 900, main memory 904 and processing device 902 also constituting computer-readable media. The instructions may further be transmitted or received over a network 920 via network interface device 908.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "providing", "receiving", "configuring", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
providing, by a processing device, a first view of a graphical user interface (GUI) to be displayed on a client device, wherein the first view is associated with relative inverse kinematics (RIK) interactions of a video game character;
receiving, by the processing device, a selection of a first GUI element comprised by the first view of the GUI, the selection indicating that a RIK target is to be added to an animation associated with the video game character;
in response to the receiving the selection, providing a second view of the GUI to be displayed on the client device, wherein the second view comprises an inverse kinematic (IK) joint option, a relative actor option, and a relative joint option, the options associated with the animation;
receiving, by the processing device, a first selection associated with the IK joint option, a second selection associated with the relative actor option, and a third selection associated with the relative joint option;
configuring, by the processing device, the animation according to the first selection, the second selection, and the third selection; and
inserting, by the processing device, the animation into a video game.

2. The method of claim 1, wherein the IK joint option comprises a plurality of selectable joints associated with the video game character, the plurality of selectable joints comprising locations on a body of the video game character that are eligible to be constrained in the animation.

3. The method of claim 2, wherein the relative actor option comprises a plurality of selectable relative actors associated with the animation, the plurality of selectable relative actors comprising additional video game characters that are eligible to be constrained to the first selection associated with the IK joint option in the animation.

4. The method of claim 3, wherein the relative joint option comprises a plurality of selectable joints associated with the second selection associated with the relative actor option, the plurality of selectable joints comprising locations on a body of the second selection associated with the relative actor option that are eligible to be constrained to the first selection associated with the IK joint in the animation.

5. The method of claim 1, wherein the second view of the GUI further comprises a selectable target animatable identifier (ID) option that indicates a game state that comprises the animatable ID of the second selection associated with the relative actor option.

6. The method of claim 1, wherein the second view of the GUI further comprises:
a reach curve GUI element, the reach curve element to control a manipulation of a RIK animation associated with the first, second and third selections, the reach curve GUI element comprising:
a graph element;
an editable table element; and
a plurality of selectable button elements, the button elements to add and remove points from the graph element and the editable table element.

7. The method of claim 6, wherein the reach curve GUI element further comprises:
a selectable regenerate curves GUI element, wherein when selected, the processing device automatically generates a reach curve for the RIK target.

8. A system comprising:
a memory; and
a processing device, operatively coupled to the memory, the processing device to:
provide a first view of a graphical user interface (GUI) to be displayed on a client device, wherein the first view is associated with relative inverse kinematics (RIK) interactions of a video game character;
receive a selection of a first GUI element comprised by the first view of the GUI, the selection indicating that a RIK target is to be added to an animation associated with the video game character;
in response to the receiving the selection, provide a second view of the GUI to be displayed on the client device, wherein the second view comprises an inverse kinematic (IK) joint option, a relative actor option, and a relative joint option, the options associated with the animation;
receive a first selection associated with the IK joint option, a second selection associated with the relative actor option, and a third selection associated with the relative joint option;
configure the animation according to the first selection, the second selection, and the third selection; and
insert the animation into a video game.

9. The system of claim 8, wherein the IK joint option comprises a plurality of selectable joints associated with the video game character, the plurality of selectable joints comprising locations on a body of the video game character that are eligible to be constrained in the animation.

10. The system of claim 9, wherein the relative actor option comprises a plurality of selectable relative actors associated with the animation, the plurality of selectable relative actors comprising additional video game characters that are eligible to be constrained to the first selection associated with the IK joint option in the animation.

11. The system of claim 10, wherein the relative joint option comprises a plurality of selectable joints associated with the second selection associated with the relative actor option, the plurality of selectable joints comprising locations on a body of the second selection associated with the relative actor option that are eligible to be constrained to the first selection associated with the IK joint in the animation.

12. The system of claim 8, wherein the second view of the GUI further comprises a selectable target animatable identifier (ID) option that indicates a game state that comprises the animatable ID of the second selection associated with the relative actor option.

13. The system of claim 8, wherein the second view of the GUI further comprises:
a reach curve GUI element, the reach curve element to control a manipulation of a RIK animation associated with the first, second and third selections, the reach curve GUI element comprising:
a graph element;
an editable table element; and
a plurality of selectable button elements, the button elements to add and remove points from the graph element and the editable table element.

14. The system of claim 13, wherein the reach curve GUI element further comprises:
a selectable regenerate curves GUI element, wherein when selected, the processing device is to automatically generate a reach curve for the RIK target.

15. A non-transitory machine-readable storage medium including instructions that, when accessed by a processing device, cause the processing device to:
provide a first view of a graphical user interface (GUI) to be displayed on a client device, wherein the first view is associated with relative inverse kinematics (RIK) interactions of a video game character;
receive a selection of a first GUI element comprised by the first view of the GUI, the selection indicating that a RIK target is to be added to an animation associated with the video game character;
in response to the receiving the selection, provide a second view of the GUI to be displayed on the client device, wherein the second view comprises a plurality of options associated with the animation;
receive, by the processing device, a plurality of selections corresponding to the plurality of options associated with the animation;
configure the animation according to the plurality of selections; and
insert the animation into a video game.

16. The non-transitory machine-readable storage medium of claim 15, wherein the plurality of options associated with the animation comprises an IK joint option, the IK joint option comprising a plurality of selectable joints associated with the video game character, the plurality of selectable joints comprising locations on a body of the video game character that are eligible to be constrained in the animation.

17. The non-transitory machine-readable storage medium of claim 16, wherein the plurality of options associated with the animation comprises a relative actor option, the relative actor option comprising a plurality of selectable relative actors associated with the animation, the plurality of selectable relative actors comprising additional video game characters that are eligible to be constrained to the first selection associated with the IK joint option in the animation.

18. The non-transitory machine-readable storage medium of claim 17, wherein the plurality of options associated with the animation comprises a relative joint option, the relative joint option comprising a plurality of selectable joints associated with the second selection associated with the relative actor option, the plurality of selectable joints comprising locations on a body of the second selection associated with the relative actor option that are eligible to be constrained to the first selection associated with the IK joint in the animation.

19. The non-transitory machine-readable storage medium of claim 15, wherein the second view of the GUI further comprises:
    a reach curve GUI element, the reach curve element to control a manipulation of a RIK animation associated with the first, second and third selections, the reach curve GUI element comprising:
    a graph element;
    an editable table element; and
    a plurality of selectable button elements, the button elements to add and remove points from the graph element and the editable table element.

20. The non-transitory machine-readable storage medium of claim 19, wherein the reach curve GUI element further comprises:
    a selectable regenerate curves GUI element, wherein when selected, the processing device is to automatically generate a reach curve for the RIK target.

* * * * *